United States Patent
Kishigami

(10) Patent No.: US 7,197,395 B2
(45) Date of Patent: Mar. 27, 2007

(54) ROUTE GUIDANCE LEARNING DEVICE

(75) Inventor: Keiju Kishigami, Tokyo (JP)

(73) Assignee: Mitsubhishi Denki Kabushiki Kaisha, Tokyo (JP)

( * ) Notice: Subject to any disclaimer, the term of this patent is extended or adjusted under 35 U.S.C. 154(b) by 113 days.

(21) Appl. No.: 10/814,152

(22) Filed: Apr. 1, 2004

(65) Prior Publication Data

US 2004/0199325 A1  Oct. 7, 2004

(30) Foreign Application Priority Data

Apr. 3, 2003  (JP) .............................. 2003-100627

(51) Int. Cl.
G01C 21/30 (2006.01)
(52) U.S. Cl. .................. 701/210; 701/209; 340/995.21
(58) Field of Classification Search ................ 701/210, 701/209; 340/995.21
See application file for complete search history.

(56) References Cited

U.S. PATENT DOCUMENTS

| 5,184,303 A | | 2/1993 | Link | |
|---|---|---|---|---|
| 5,243,528 A | * | 9/1993 | Lefebvre | 701/211 |
| 5,262,775 A | * | 11/1993 | Tamai et al. | 340/995.21 |
| 5,291,414 A | * | 3/1994 | Tamai et al. | 701/210 |
| 5,311,434 A | * | 5/1994 | Tamai | 701/210 |
| 6,487,496 B2 | * | 11/2002 | Katayama et al. | 701/209 |
| 6,507,785 B1 | * | 1/2003 | Stefan et al. | 701/210 |
| 6,594,580 B1 | * | 7/2003 | Tada et al. | 701/211 |
| 6,847,885 B2 | * | 1/2005 | Sato et al. | 701/201 |
| 6,980,098 B2 | * | 12/2005 | Shinada et al. | 340/439 |
| 2004/0128066 A1 | * | 7/2004 | Kudo et al. | 701/204 |

FOREIGN PATENT DOCUMENTS

| DE | 100 52 194 A1 | 6/2001 |
|---|---|---|
| DE | 100 05 780 A1 | 8/2001 |
| EP | 1 111 340 A2 | 6/2001 |
| JP | 61-182200 A | 8/1986 |
| JP | 5-232873 A | 9/1993 |
| JP | 9-128689 A | 5/1997 |
| JP | 10047984 | 2/1998 |
| JP | 2000-009484 A | 1/2000 |
| JP | 2000009484 A * | 1/2000 |
| JP | 2000-088590 | 3/2000 |

* cited by examiner

Primary Examiner—Thomas Black
Assistant Examiner—Marie A Weiskopf
(74) Attorney, Agent, or Firm—Sughrue Mion, PLLC

(57) ABSTRACT

A deviant position detector that determines whether or not a vehicle deviated from a set route, detects route deviation information such as a route deviated position when a vehicle deviated, and stores it as past route deviation information in a route deviant position memory. A route searching device searches a route to a destination based on information obtained by a position detector and a map information acquiring device, and further searches past route deviation information obtained from the route deviant position memory. A route guidance changing device determines whichever route guidance method is the best based on information obtained by the route searching device and from the route deviant position memory, and instructs a route guidance outputting device to output the best route guidance method.

12 Claims, 5 Drawing Sheets

ROUTE GUIDANCE LEARNING DEVICE

BACKGROUND OF THE INVENTION

1. Field of the Invention

The present invention relates to a route guidance learning device contrived to learn in what way a vehicle deviated from a route in the past, and to correct its guidance method at all times.

2. Description of the Related Art

A navigation system for a vehicle informs a user via voice or visual display that the user has to go straight, turn to the right, or turn to the left short of an intersection when a running vehicle approaches the intersection. The system prevails that the guidance information is given to a user at the predetermined timing short of the intersection. Therefore, there is a circumstance in which timing may not necessarily be said to be appropriate, depending on a driver's driving skill and the sense of distance.

As a prior art achieved success in curing this defect, a device has been proposed which is disclosed in JP 05-232873 A in which the device is arranged such that it calculates an arrival distance or an arrival time from the current position of a vehicle to an intersection lying on a route on the basis of road map data, outputs guidance information when the calculated value comes to the previously set distance or time, as well as arbitrarily sets the distance or time, and outputs guidance information at the timing according to a driver's skill and the sense of distance.

The conventional device thus arranged as above has been proposed, however, the device entails a drawback that it causes inconvenience to a user of previously inputting an arrival distance or an arrival time, and further it is difficult for a user who inputs a value to judge whether or not an input value is really proper.

Therefore, when an value input by a user is improper, a vehicle can deviate from the prescribed route. In this case, information indicating in what way a vehicle deviated from a route is by no means reflected upon the next route guidance in order to automatically correct a route guidance. For this reason, when a user takes the same route again, the user is in danger of repeatedly committing a similar deviation from a route to the past.

SUMMARY OF THE INVENTION

The present invention has been made to solve the above-mentioned problems. An object of the present invention is to provide a route guidance learning device able to store information indicating in what way a vehicle deviated from a route, learn from the stored information when a vehicle travels on the same route again, and automatically correct its guidance method whenever occasion demands to obviate beforehand a deviation of the vehicle from a guidance route.

A route guidance learning device according to the present invention includes operation inputting means for inputting the destination; position detecting means for detecting the current position; map information acquiring means for acquiring map information; route searching means for searching a route from the current position to the destination on the basis of information input by the operation inputting means, the position detecting means, and the map information acquiring means; route deviant position determining means for determining a deviated position from the searched route; and route deviant position storing means for storing the determined route deviated position; wherein the route guidance changing means changes a route guidance on the basis of information on the route deviated position stored in the route deviant position storing means.

According to the present invention, the invention stores information indicating in what way a vehicle deviated from a route in the past, and automatically corrects a guidance method whenever occasion calls by using the stored information when the vehicle travels on the same route again, thereby preventing beforehand a vehicle from deviating from a guidance route.

DETAILED DESCRIPTION OF THE PREFERRED EMBODIMENTS

A preferred embodiment of the present invention will now be described below with reference to the attached drawings.

First Embodiment

Figure 1:
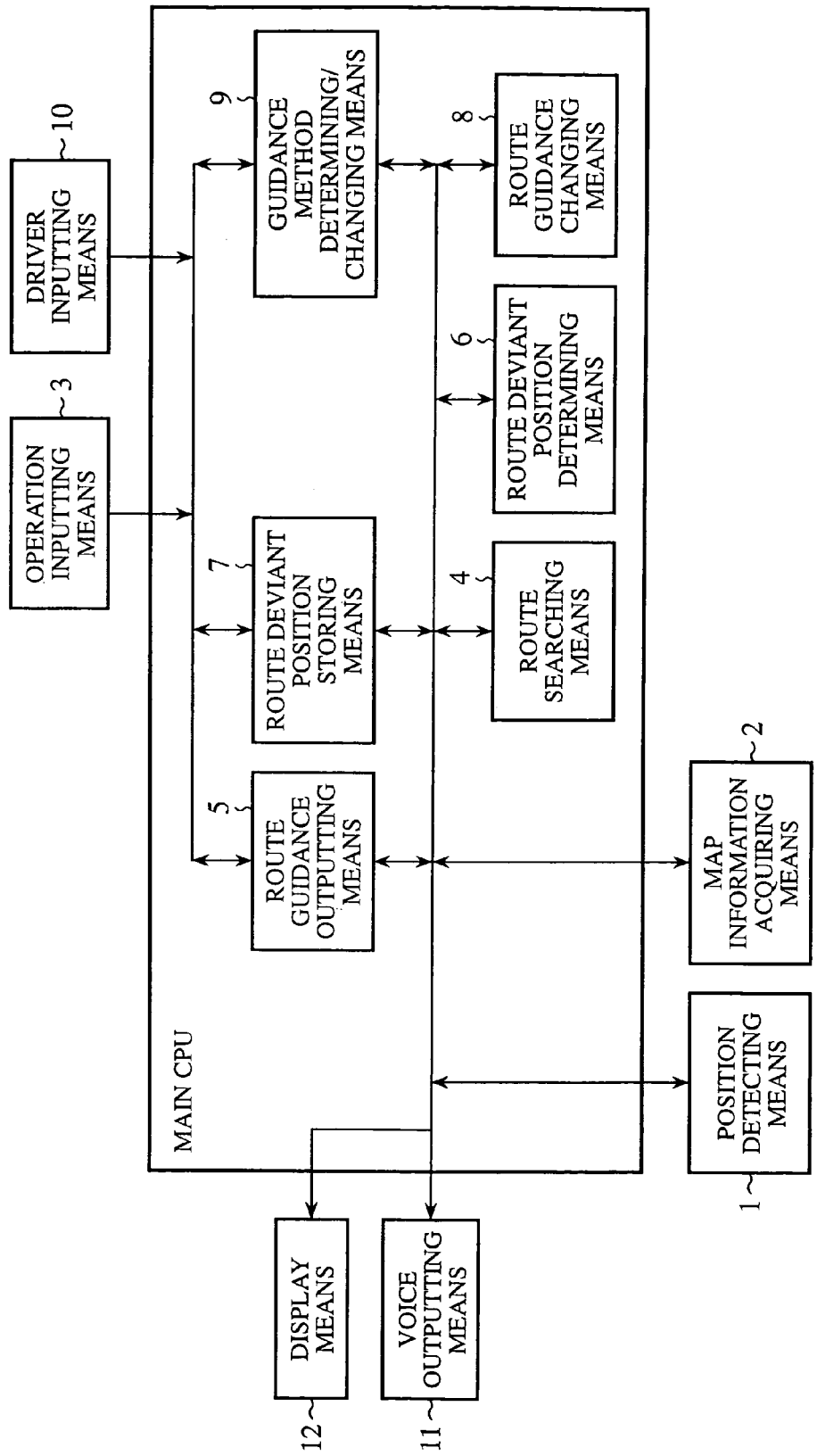
FIG. 1 is a block diagram showing a functional configuration of a route guidance learning device according to a first embodiment of the present invention.

FIG. 1 is a block diagram showing a functional configuration of the route guidance learning device according to the first embodiment of the present invention.

As shown in FIG. 1, the route guidance learning device includes position detecting means 1, map information acquiring means 2, operation inputting means 3, route searching means 4, route guidance outputting means 5, route deviant position determining means 6, route deviant position storing means 7, route guidance changing means 8, guidance method determining/changing means 9, driver inputting means 10, voice outputting means 11, and display means 12.

Here, the position detecting means 1 is for detecting the current position of a vehicle.

The map information acquiring means 2 includes a CD-ROM and a DVD-ROM, and acquires map information from these ROMs.

The operation inputting means 3 is for inputting by a driver necessary information on the destination or the like.

The route searching means 4 is for searching a route extending from a current position to the destination on the map data.

The route guidance outputting means 5 is for outputting route guidance information in the course of a set route or route guidance information at a set guidance point.

The route deviant position determining means 6 is for determining whether or not a vehicle deviated from a route along which the vehicle is being guided by relying upon the position detecting means 1, the map information acquiring means 2, and the route searching means 4. When the vehicle deviated from the route, the route deviant position determining means 6 detects route deviation information containing a route deviated date and hour, a route deviated position, and a route deviated situation composed of positional relationship between the route deviated position and a route guidance information output point.

The route deviant position storing means 7 is for storing the route deviated date and hour, the route deviated position, and the route deviated situation, which are detected by the route deviant position determining means 6, and further storing information input by a driver through the operation inputting means 3 as route deviation information correlated with the driver information input by the driver inputting means 10. In this case, if there are a plurality of driver information, the above information are stored for each of drivers.

The route guidance changing means 8 compares a route guidance target point obtained by the position detecting means 1, the map information acquiring means 2, and the route searching means 4 with information obtained from the route deviant position storing means 7 to determine whichever guidance method is the optimum, and gives instructions to the route guidance outputting means 5.

The guidance method determining/changing means 9 changes decision conditions for a guidance method adopted in the route guidance changing means 8.

The driver inputting means 10 is for obtaining information on a driver.

The voice outputting means 11 is for giving route guidance information (message) to a user via voice.

The display means 12 is for displaying a map, a route, or route guidance information or any other information when a vehicle approaches a guidance point.

Figure 2:
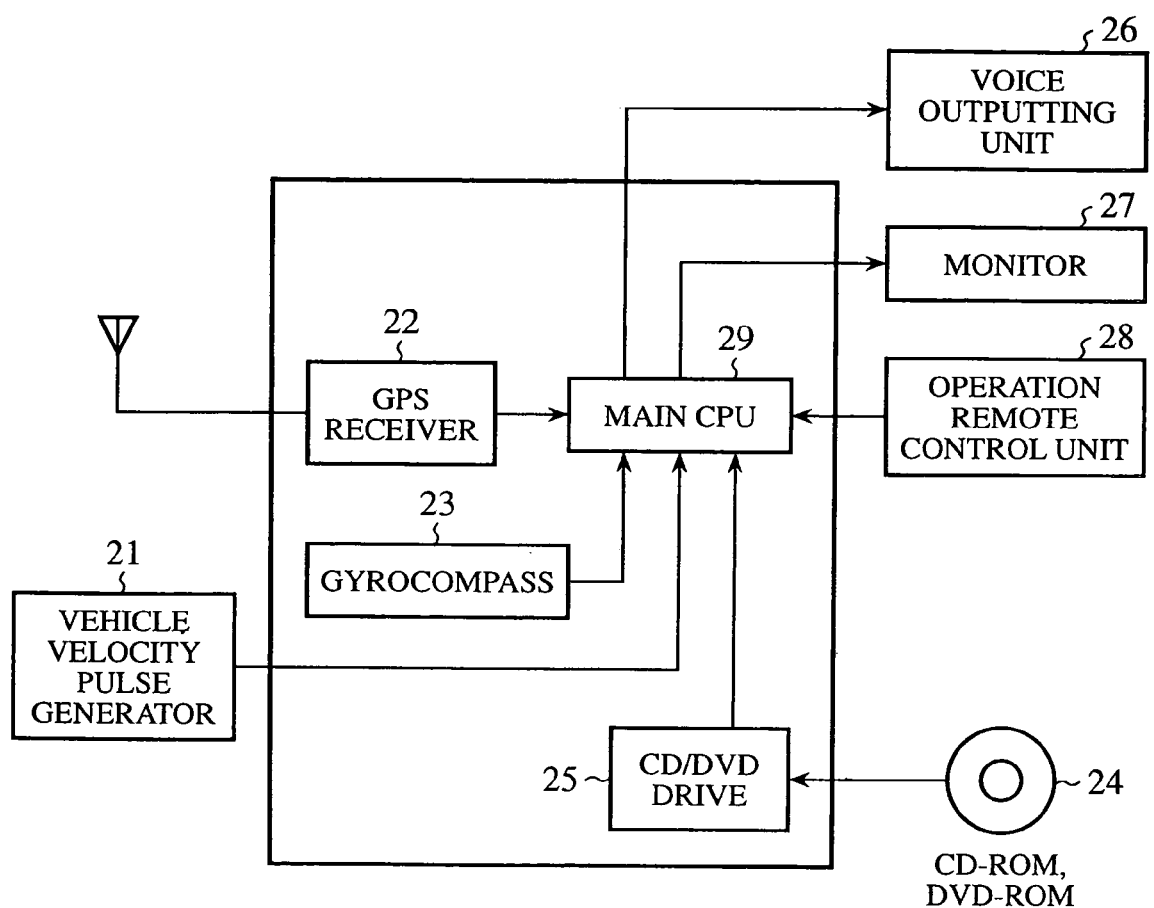
FIG. 2 is a block diagram showing a hardware configuration of a route guidance learning device according to a first embodiment.

FIG. 2 is a block diagram showing a functional configuration illustrated in FIG. 1 in a hardware configuration.

As shown in FIG. 2, the route guidance learning device is composed of a vehicle velocity pulse generator 21, a GPS (global positioning system) receiver 22, a gyrocompass 23, a CD-ROM (compact disc read-only memory)/DVD-ROM (digital versatile disk read-only memory) 24, a CD/DVD drive 25, a voice outputting unit 26, a monitor 27, an operation remote control unit 28, and a main CPU 29.

Here, the vehicle velocity pulse generator 21 is for generating a pulse signal every unit travel distance in accordance with revolutions of a tire of a vehicle, and serving as a distance sensor for detecting a traveling distance of a vehicle. Counting the number of pulse signal detects the traveling distance of a vehicle.

The GPS receiver 22 is for detecting the current position of a vehicle, on which the route guidance learning device is mounted based on signals from artificial satellites.

The gyrocompass 23 acts as an azimuth sensor for detecting orientation toward which a vehicle faces.

The above-mentioned vehicle velocity pulse generator 21, GPS receiver 22, and gyrocompass 23 constitute the position detecting means 1 shown in FIG. 1.

The CD-ROM/DVD-ROM 24 is a storage medium in which the digitized map data is stored.

The CD/DVD drive 25 is for driving the CD-ROM/DVD-ROM 24, and reading out the map data.

The above-described CD-ROM/DVD-ROM 24 and CD/DVD drive 25 constitute the map information acquiring means 2 shown in FIG. 1.

The voice outputting unit 26 is for outputting a route guidance message, and constituting the voice outputting means 11 shown in FIG. 1.

The monitor 27 is composed, e.g., of a liquid crystal display and the like, and is for displaying the map information, routes, and a route guidance or any other information. The monitor constitutes the display means 12 shown in FIG. 1.

The operation remote control unit 28 is used by a user for manipulation of the route guidance learning device, and constitutes the operation inputting means 3 shown in FIG. 1.

The main CPU 29 assumes charge of performing current position processing based on information obtained from the vehicle velocity pulse generator 21, the GPS receiver 22, and the gyrocompass 23, map information acquisition processing obtained from the CD/DVD drive 25, and operation inputting processing obtained by the remote control units 28.

The main CPU 29 is constituted by the route searching means 4, route guidance outputting means 5, route deviant position determining means 6, route deviant position storing means 7, route guidance changing means 8, and guidance method determining/changing means 9 shown in FIG. 1.

Moreover, the main CPU 29 controls the voice outputting unit 26 and the monitor 27.

The general operation of the route guidance learning device will now be described with reference to FIG. 1 and FIG. 3.

Figure 3:
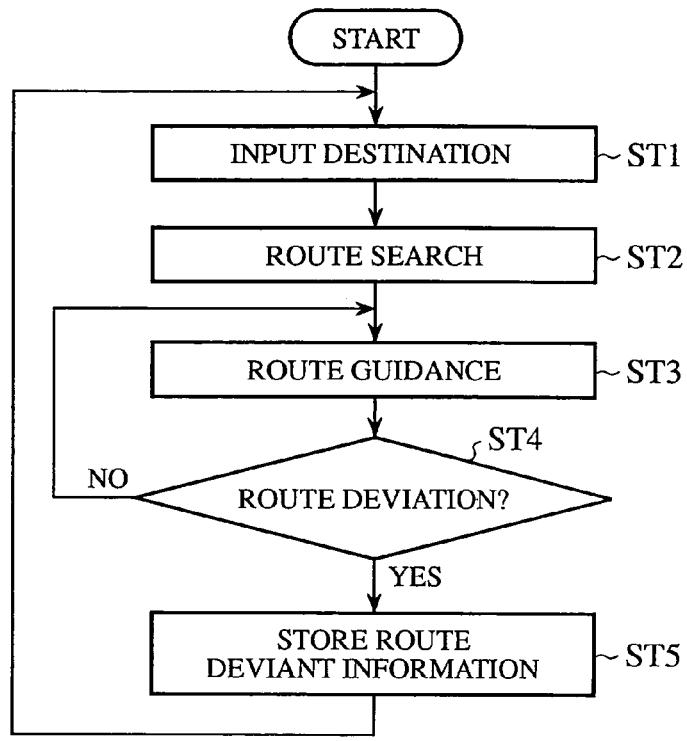
FIG. 3 is a flow chart showing a general procedure of a route guidance learning device according to a first embodiment.

FIG. 3 is a flow chart showing a general procedure of the route guidance learning device.

In step ST1, a driver operates the operation inputting means 3 to input the destination.

In step ST2, a route is searched by the route searching means 4.

In other words, the position detecting means 1 detects the current position of a-vehicle, the map information acquiring means 2 acquires map information, and the route deviated position storing means 7 acquires route deviation information. The route searching means 4 searches and sets a route extending from the current position detected based on the map information and the route deviation information to the destination set in step ST1. As to this route search will be described later.

In step ST3, the route guidance outputting means 5 outputs route guidance information at each guidance point on the route which is searched and set in step ST2. The route guidance information is output in obedience to instructions of the route guidance changing means 8. Similarly, as to a change in this route search will also be described later.

The voice outputting means 11 outputs route guidance voice information on the basis of the above-mentioned guidance information, and informs a driver thereof.

Moreover, the display means 12 displays the above-mentioned route guidance information.

In step ST4, the route deviant position determining means 6 determines whether or not a route along which a vehicle is traveling deviated from the route which is being guided in step ST3.

If the vehicle does not deviate from the route (step ST4-No), then the process returns to step ST3 and continues the processing (Step ST4-step ST3).

Otherwise(step ST4-Yes), the route deviant position detecting means 6 detects information containing a route deviated date and hour, a route deviated position, and a route deviated situation, and the process proceeds to step ST5.

In step ST5, if the vehicle deviated from the route in step ST4, the route deviant position storing means 7 correlates the route deviated date and hour, the route deviated position, the route deviated situation, which are detected in step STP 4, as well as information input by a driver through the operation inputting means 3 with driver information input by the driver inputting means 10, and stores the above information as route deviation information. In this case, when there are a plurality of driver information, the above-described information stores for each of drivers.

The above route deviation information stored in the route deviant position storing means 7 is applied as information in the next route search made in step ST2 (Step ST4-step ST2).

This enables a route search, in which information on the past route deviation is utilized, when a vehicle travels on the same route the next time.

The discussion will now be held below on in what manner the route deviation information is being stored in the route deviant position storing means 7.

Figure 4:
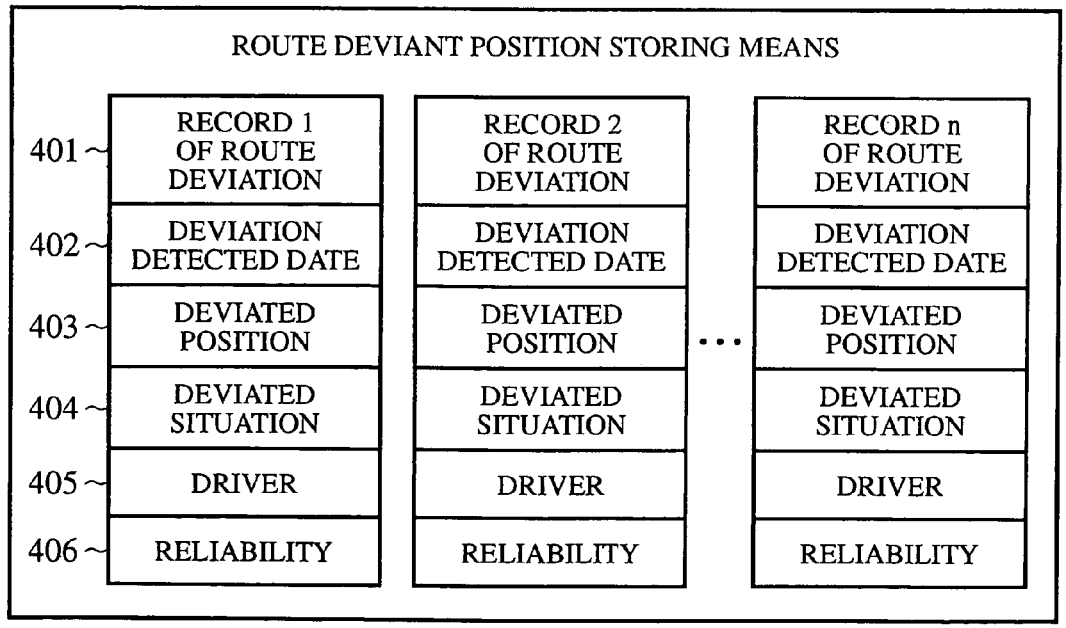
FIG. 4 is a diagram showing an instance of route deviation information stored in route deviant position storing means 7 in a route guidance learning device according to a first embodiment.

FIG. 4 is a diagram showing an instance of the route deviation information stored in the route deviant position storing means 7.

Referring to FIG. 4, reference numeral 401 denotes a record of a route deviation, which is a unit of pieces of information stored every time a route deviation is occurred. The record contains a date and hour at which a route deviation is detected (Deviation Detected Date) (402), a position where a route deviation is occurred (Deviated Position) (403), a route deviated situation (404), a user who is driving a vehicle when a deviation is detected (405), and reliability (406).

Here, the situation (404) consists of positional relationship between the route deviated route and a route guidance information output point. The information indicates, e.g., why things have came to such a situation as with the case where a vehicle deviated from a route because the route guidance information is output too early at a point short of the predetermined point.

The reliability (406) indicates to what extent the route deviation information itself is reliable. For example, when a driver inputs information indicative of a willful deviation from a route through the operation inputting means 3, reliability becomes naturally low.

In this way, the route deviant position storing means 7 correlates the information on the route deviated position with the information input by a driver through the operation inputting means 3, and stores it as one of the route deviation information.

The information so configured as above stored in the route deviant position storing means 7 logs histories indicating in what way a route deviation is occurred in the past. Moreover, the impartation of "reliability" makes it possible to record that the information stored herein has low reliability when a driver, e.g., deliberately deviated from a guidance route as described above. This improves the accuracy of the stored information.

Further, when the route deviant position determining means 6 newly determined a route deviation, the route deviant position storing means 7 accumulates information obtained by this new determination.

The accumulation of information may contain update process. For example, when a vehicle traveled on the same route later again where a driver had experienced a route deviation, the past route deviation information may be updated by the new route deviation information.

The update allows the information stored in the route deviant position storing means 7 to be always kept in a current state according to familiarity of a driver.

In addition, in view of the fact that familiarity with a route search varies depending on an individual driver, information indicating who is a driver among a plurality of drivers is previously input through the driver inputting means 10 by resorting to an identification card or the like. Then, the route deviant position storing means 7 stores the above information as route deviation information by correlating the information detected by the route deviant position determining means 6 with each of driver information.

This implements the route deviant position storing means 7 in which route deviation information with high accuracy is stored according to traits of characteristics of each of a plurality of drivers, and seizes an opportunity to easily determine which information is valuable for an actual driver.

Moreover, the route guidance changing means 8 determines the most effective guidance method based on the route deviation information customized for each of drivers.

The processing executed in the route searching means 4 will now be described below.

Figure 5:
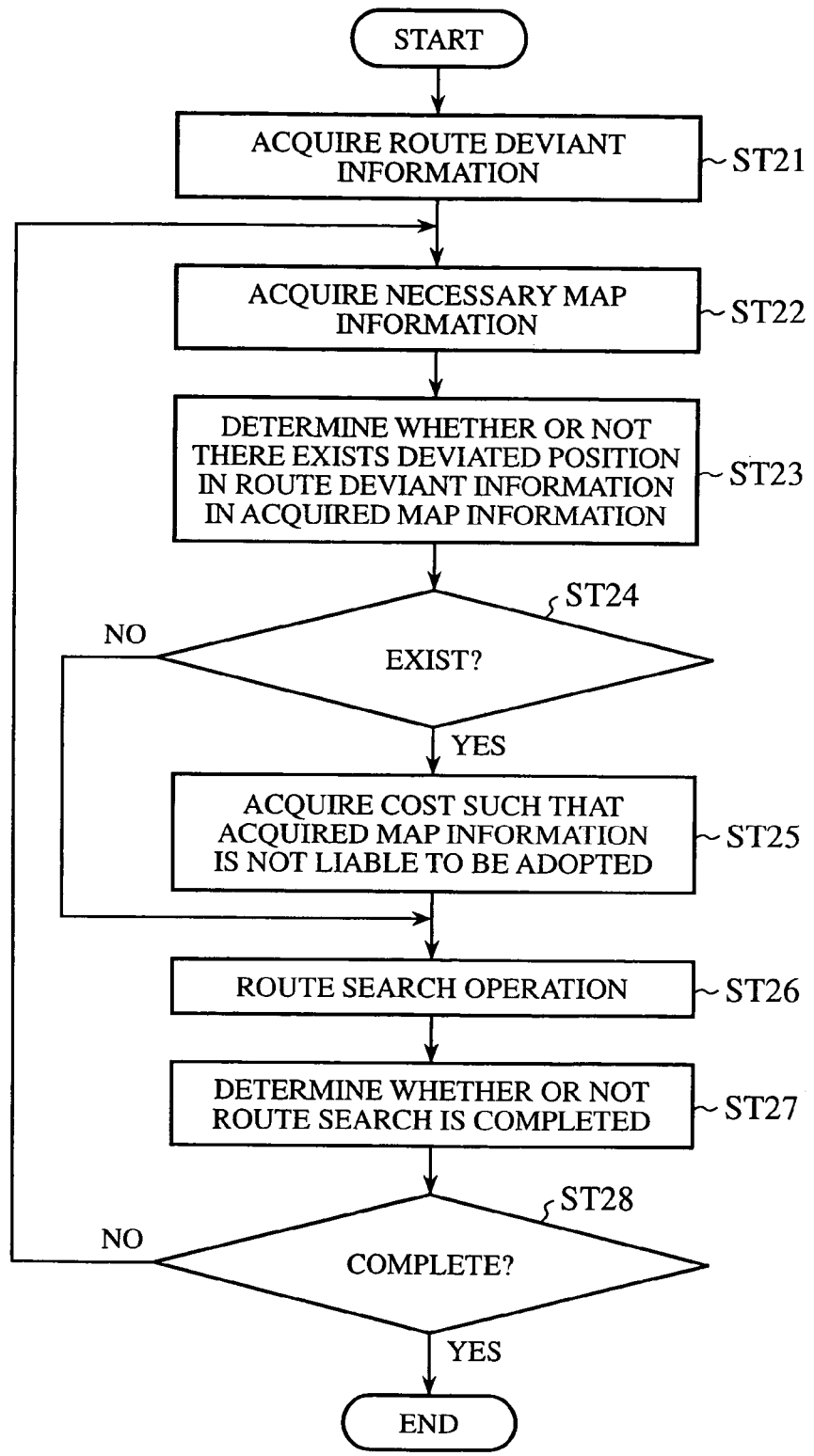
FIG. 5 is a flow chart showing an example of a procedure executed by route searching means 4 in a route guidance learning device according to a first embodiment.

FIG. 5 is a flow chart showing an example of a procedure (step ST2 shown in FIG. 3) executed in the route searching means 4.

In step ST21 shown in FIG. 5, the route guidance learning device acquires route deviation information (record) customized for each of drivers from the route deviant position storing means 7.

In step ST22, map information acquiring means 2 acquires map information necessary for a route search, from the current position of the vehicle detected by the position detecting means 1 to the destination set by the operation inputting means 3, by the map information acquiring means 2.

In step ST23 and step ST24, the device determines whether or not there exists any highly reliable deviated position stored in the route deviation information acquired in step ST21, in the map information acquired in step ST22.

If there exists some deviant positions therein (step ST24-Yes), then the device adjusts in step ST25 the cost such that the acquired map information is not likely to be adopted as a search route. Otherwise (step ST24-No), the device performs a route search operation in step ST26. When the cost of the map information have been adjusted, a route search operation is executed by using the map information. In this operation, a route is determined that avoids the past deviated position if possible. This reduces the likelihood of a vehicle deviating from a guidance route.

The "cost adjustment" means that a pertinent section of the map data (link data) is modified such that the map information is not likely to be adopted as a guidance route. For example, a distance in the map data is multiplied by a coefficient so as to make the distance longer than its actual length, such that the distance is not likely to be adopted as a route search.

In step ST27 and step ST28, if a route search is not yet completed (step ST28-No), the process returns to step ST22, or else (step ST28-Yes), a route search is ended accordingly. 7 Moreover, when the past deviant position is not avoided, notification is given, which will be described in following FIG. 6.

The processing executed in the route guidance changing means 8 will now be described below.

Figure 6:
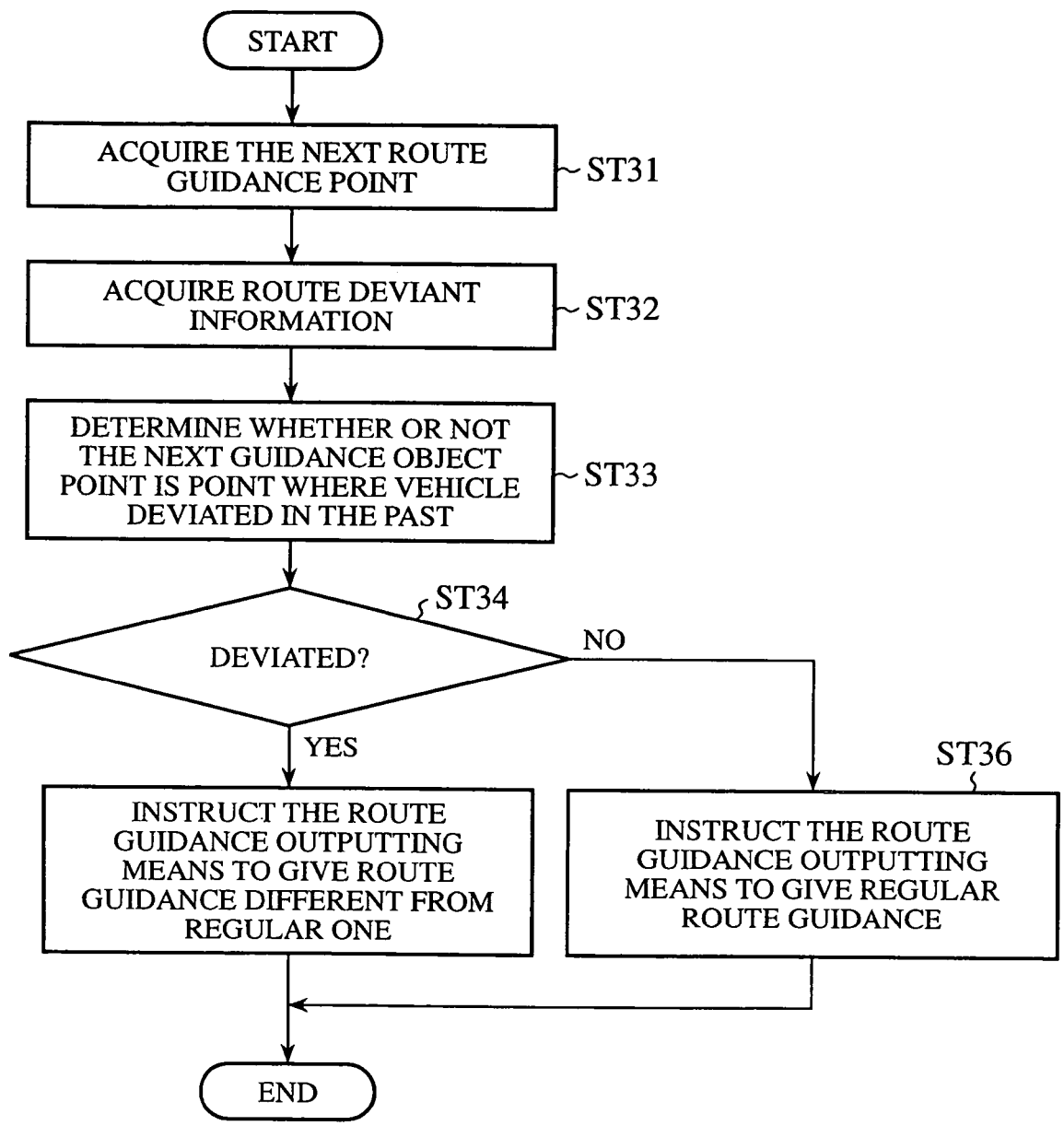
FIG. 6 is a flow chart showing an example of a procedure executed by route guidance changing means 8 in a route guidance learning device according to a first embodiment.

FIG. 6 is a flow chart showing an example of a procedure (step ST3 shown in FIG. 3) executed in the route guidance changing means 8.

Referring to FIG. 6, in step ST31, information on the next route guidance target point is acquired based on information obtained by the route searching means 4. In step ST32, the route guidance learning device acquires a route deviation record customized for each of drivers from the route deviant position storing means 7.

In step ST33 and step ST34, the device determines whether or not the next route guidance target point is a point where a vehicle deviated in the past inclusive of its reliability. If a route deviation is occurred (step ST34-Yes), the device instructs the route guidance outputting means 5 to change a regular (predetermined) route guidance to give a route guidance in step ST35. Otherwise (step ST34-No), the device instructs the route guidance outputting means 5 to give a driver a regular (predetermined) guidance in step ST36.

As mentioned above, when the next route guidance target point is a point where a route deviation is occurred in the past, the route guidance changing means 8 changes a route guidance, and the route guidance outputting means 5 gives a notification. Thereby, a driver pays attention to a point where he/she had experienced a route deviation in the past, which reduces the likelihood of deviating from a guidance route.

Here, embodiments of changing a route guidance involves changing output contents displayed on a route guidance display, changing output contents and volume of route guidance voice, changing the number of times of a route guidance itself, changing a voice speed (playback speed) of a route guidance, and changing timing at which a route guidance is given. For instance, a measure may be taken to change the remaining distance to a guidance point on a guidance display, or to turn up volume of route guidance voice.

Instead, on the occasion of changing timing of a route guidance, when a point where a route deviation is occurred in the past is located ahead of the next route guidance point, it maybe determined that timing of the past route guidance is given too early, and timing of a route guidance for the next route guidance point may be delayed. On the contrary, when a point where a route deviation is occurred in the past is located behind the next route guidance point, timing of a route guidance for the next route guidance point may be advanced.

Alternatively, the guidance method determining/changing means 9 may be provided for changing conditions for a route guidance given by the route guidance changing means 8, and the conditions are changed so as to select either of the above methods of a route guidance, which are different from a regular one, or to combine a plurality of methods. This permits a vehicle to reduce the likelihood of deviating from a guidance route.

While in the above explanation, the present invention has been described mainly by placing a focus on a vehicle navigating device as an applicable target, the invention may also be applied as a matter of course to a cellular phone equipped with a navigation function.

For example, carrying this cellular phone when riding on a bicycle or motorcycle on the road prevents beforehand a cyclist or motorcyclist from deviating from a route.

As mentioned above, according to the first embodiment, it is arranged such that the route guidance learning device determines whether or not a route deviation is occurred, when a route deviation is occurred, the device stores, as information on the past route deviation, route deviated dates and hours, route deviated positions, route deviated situations, drivers, and reliability; and at the time of the next route search, the device takes advantage of the stored past information to determine whichever method is the best for a route guidance. Therefore, the device learns in what way the past route deviations are occurred, and automatically correct whenever occasion demands a route guidance method by making use of the stored information in traveling on the same route, thereby obviating beforehand a deviation of a vehicle from a guidance route.

Besides, the route deviant position storing means 7 stores route deviation information correlated with each of a plurality of drivers, and the route guidance changing means 8 determines whichever guidance method is the most effective based on the route deviation information corresponding to drivers. Accordingly, the device can store route deviation information with high accuracy according to traits of characteristics of each of a plurality of drivers, thereby easily determining which information is virtually valuable for each of drivers.

The route deviant position storing means 7 accumulates route deviation information, which contributes to improvement in the accuracy of prevention of a deviation from a guidance route.

Updating the above route deviation information allows the information stored in the route deviant position storing means 7 to be keeping always in the latest state depending on familiarity of a driver.

The route deviant position storing means 7 stores as one of the route deviation information by correlating with information input by a driver through the operation inputting means 3. Accordingly, when a driver inputs, e.g., information indicative of a willful route deviation through the operation inputting means 3, the device can record an evidence to show that reliability thereof is low. This improves the accuracy of the stored information.

The route searching means 4 can make a route search in which a route where a route deviation tends to occur, which can help reduce the likelihood of the route deviation occurring again.

When the next route guidance target point is a point where a route deviation has occurred in the past, the route guidance changing means 8 changes, e.g., output contents displayed on a route guidance display, output contents and volume of a route guidance voice, the number of times of a route guidance, and a voice speed of a route guidance, or delays or advances timing of a route guidance. Then, the route guidance changing means gives a driver a route guidance from the route guidance outputting means 5. Therefore, a driver pays attention to a point where a route deviation is occurred in the past by virtue of notification in a wide variety of ways, thereby reducing the likelihood of a route deviation to occur.

The guidance method determining/changing means 9 is provided for changing conditions of a route guidance output by the route guidance changing means 8. Therefore, the conditions are changed so as to select either of the above methods of a route guidance, which are different from a regular one, or a plurality of methods by a driver's own preference, thereby reducing the likelihood of a route deviation to occur.

What is claimed is:

1. A route guidance learning device comprising:
   operation inputting means for inputting the destination;
   position detecting means for detecting the current position;
   map information acquiring means for acquiring map information;
   route searching means for searching a route from the current position to the destination on the basis of information input through the operation inputting means, the position detecting means, and the map information acquiring means;

route guidance outputting means for outputting route guidance regarding the searched route provided by the route searching means;

route deviant position determining means for determining a newly deviated position from the searched route;

route deviant position storing means for storing the newly determined route deviated position and previously determined route deviated positions, where the previously determined route deviated positions were determined when the searched route was last traveled; and route guidance changing means for changing the route guidance, prior to outputting the route guidance for the searched route, on the basis of information on the previously determined route deviated positions stored in the route deviant position storing means, such that the outputted route guidance avoids the previously determined route deviated positions.

2. The route guidance learning device according to claim 1, wherein the route deviant position storing means for storing the information on the route deviated position by correlating with information obtained by driver inputting means.

3. The route guidance learning device according to claim 1, wherein the route deviant position storing means accumulates deviated position information on the newly determined route deviated position and the previously determined route deviated positions, for changing the route guidance when the searched route is requested yet again, such that each time the searched route is subsequently requested, the route guidance is updated based on all accumulated deviated position information.

4. The route guidance learning device according to claim 1, wherein the route deviant position storing means stores deviated position information on the newly determined route deviated position and the previously determined route deviated positions by correlating with information input by a driver through the operation inputting means.

5. The route guidance learning device according to claim 1, wherein the route guidance changing means changes contents of a display of the route guidance.

6. The route guidance learning device according to claim 1, wherein the route guidance changing means changes contents of a voice output of the route guidance.

7. The route guidance learning device according to claim 1, wherein the route guidance changing means changes volume of a voice output of the route guidance.

8. The route guidance learning device according to claim 1, wherein the route guidance changing means changes the number of times of the route guidance.

9. The route guidance learning device according to claim 1, wherein the route guidance changing means changes a voice speed of the route guidance.

10. The route guidance learning device according to claim 1, wherein the route guidance changing means delays or advances timing of the route guidance.

11. The route guidance learning device according to claim 1, wherein the route guidance changing means is provided with route guidance method determining/changing means.

12. The route guidance learning device according to claim 1, wherein the route deviant position storing means accumulates deviated position information on the newly determined route deviated position and the previously determined route deviated positions for each one of a plurality of drivers, such that the route guidance for the searched route will vary depending on which one of the plurality of drivers has requested the searched route.

* * * * *

UNITED STATES PATENT AND TRADEMARK OFFICE
CERTIFICATE OF CORRECTION

PATENT NO. : 7,197,395 B2 Page 1 of 1
APPLICATION NO. : 10/814152
DATED : March 27, 2007
INVENTOR(S) : Keiju Kishigami It is certified that error appears in the above-identified patent and that said Letters Patent is hereby corrected as shown below:

Under "Assignee" (item 73) please amend the name as follows:
~~Mitsubhishi~~ Mitsubishi Denki Kabushiki Kaisha Signed and Sealed this Fifth Day of June, 2007

JON W. DUDAS
*Director of the United States Patent and Trademark Office*